United States Patent [19]
Halbert-Lassalle et al.

[11] Patent Number: 5,197,061
[45] Date of Patent: Mar. 23, 1993

[54] DEVICE FOR THE TRANSMISSION OF DIGITAL DATA WITH AT LEAST TWO LEVELS OF PROTECTION AND CORRESPONDING RECEPTION DEVICE

[75] Inventors: Roselyne Halbert-Lassalle; Jean-Francois Helard; Bernard Le Floch, all of Rennes, France

[73] Assignees: Etat Francais; Telediffusion de France, France

[21] Appl. No.: 671,483

[22] Filed: Mar. 19, 1991

[30] Foreign Application Priority Data

Mar. 23, 1990 [FR] France .................. 90 03927

[51] Int. Cl.$^5$ .................................................. H04J 9/00
[52] U.S. Cl. .......................................... 370/11; 370/19
[58] Field of Search ...................... 370/11, 19, 21, 50, 370/69.1, 70; 375/38; 371/41

[56] References Cited

U.S. PATENT DOCUMENTS 4,881,241  11/1989  Pommier et al. ..................... 375/38

Primary Examiner—Curtis Kuntz
Assistant Examiner—T. Ghebretinsae
Attorney, Agent, or Firm—Locke Reynolds

[57] ABSTRACT

A device for the transmission of digital data with at least two levels of protection, of the type providing for the distribution of the data to be transmitted in the form of digital elements in the time-frequency space and the transmission of symbols each formed by a multiplex of N orthogonal carriers modulated by a set of the digital elements, and transmitted simultaneously, the device including channel encoding means comprising at least two types of modulation and/or at least two encoding efficiency levels. This enables to optimize the use of the transmission channel by assigning differentiated transmission techniques to portions of data of a same digital train as a function of the different levels of protection sought, against transmission errors.

14 Claims, 6 Drawing Sheets

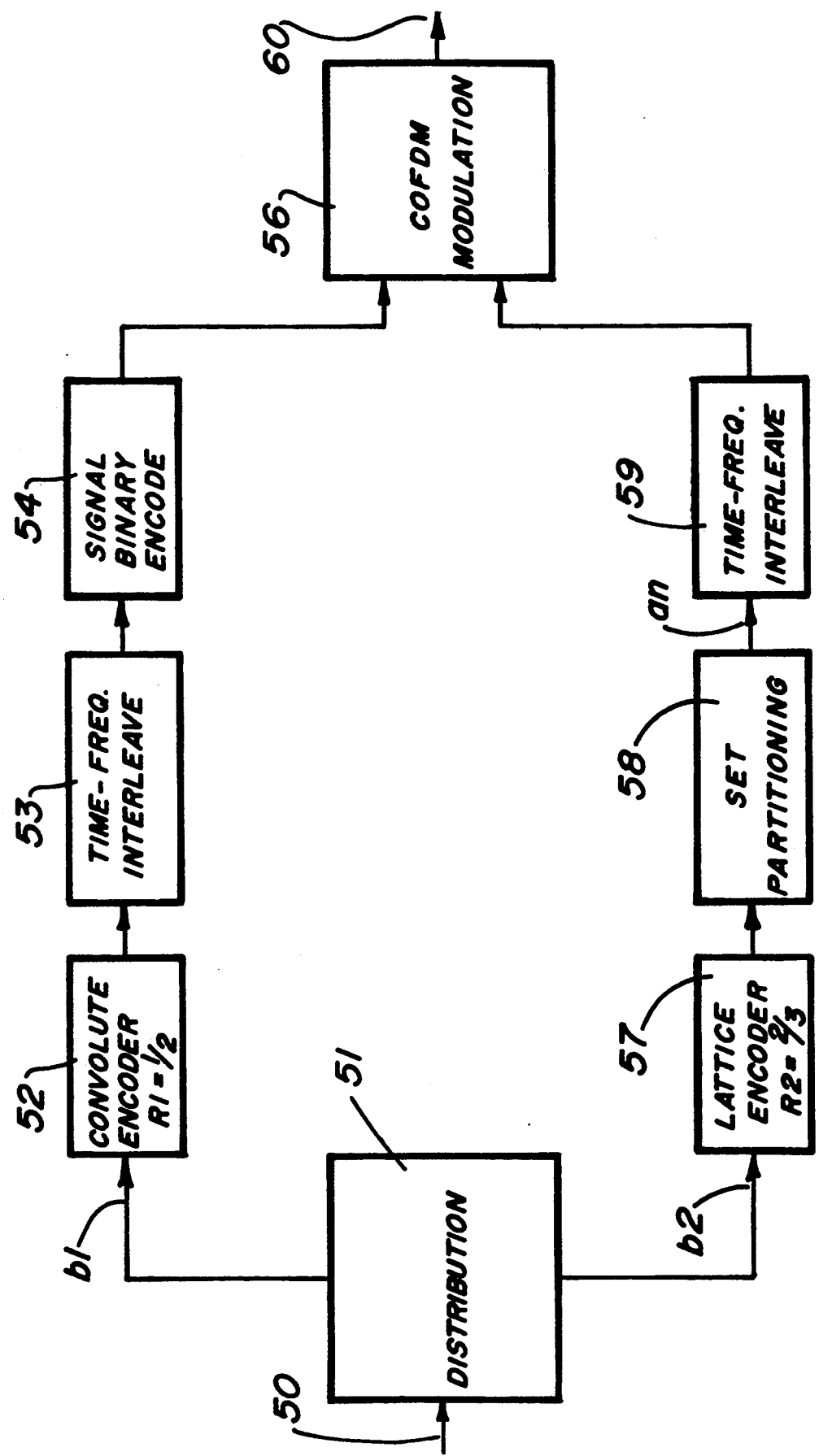

DEVICE FOR THE TRANSMISSION OF DIGITAL DATA WITH AT LEAST TWO LEVELS OF PROTECTION AND CORRESPONDING RECEPTION DEVICE

BACKGROUND OF THE INVENTION

1. Field of the Invention

The field of the invention is that of the transmission of digital data, notably in disturbed channels. More specifically, the invention relates to the transmission, in one and the same channel, of data requiring different levels of protection against transmission errors.

The transmitted data may be, for example, sound data or audiovisual data (notably in television, visiophony etc.) and, more generally, any type of digital data on which it may be worthwhile, useful or at any rate not harmful to carry out a discrimination between the digital elements using a criterion of the minimum protection level desired.

1. Description of the Prior Art

The technological background of the invention is the digital sound broadcasting system as described in the U.S. Pat. No. 4,881,241 dated 14th November 1990. The digital broadcasting system presented in these prior art patent applications is based on the joint use of a channel encoding device and a coding orthogonal frequency division multiplex (COFDM) system.

The modulation method proper of this known system consists in providing for the distribution of constituent digital elements of the data signal in the frequency-time space f-t and in the simultaneous transmission of the sets of digital elements on N parallel broadcasting channels by means of a multiplex of orthogonal carrier frequencies. This type of modulation makes it possible to prevent two successive elements of the data train from being transmitted at the same frequency. This enables the absorption of the frequency fluctuating selectivity of the channel through the frequency dispersal, during the broadcasting, of the initially adjacent digital elements.

The known encoding process is aimed, for its part, at the processing of the samples coming from the demodulator to absorb the effect of amplitude variation of the received signal, due to the Rayleigh process. The encoding is advantageously a convolutive encoding, possibly concatenated with a Reed-Solomon type of encoding.

In a known way, the encoded digital elements are furthermore interleaved, in time as well as in frequency, so as to maximize the statistical independence of the samples with respect to the Rayleigh process and to the selective character of the channel.

This method is well adapted to the broadcasting of digital signals at a high bit rate (several megabits/s) in channels that are particularly hostile. This has been demonstrated by the first embodiment of this method in digital sound radio broadcasting. In particular, it enables the reception of digital data by mobile receivers moving about in an urban environment, i.e. in the presence of parasitic noise and jamming, and under conditions of multiple propagation (Rayleigh process) generating a phenomenon of fading.

However, in its present form, this method is not used in an optimal way. The same channel encoding is used for all the data to be transmitted, with the same protection against transmission errors, irrespectively of the importance of the data elements.

It often happens that there are major differences among the pieces of digital information designed to be transmitted in the same channel. Thus, for example, in the case of sound signals, it is known that it is possible to tolerate an error rate of about 1% for the least significant bits (LSBs) while the most significant bits (MSBs) often require an error rate of less than $10^{-6}$. In the same way, in an image signal, all the transmitted coefficients do not have the same importance, especially from a psychovisual point of view.

It is clear that the error rate is related notably to the type of encoding used, all conditions of reception being moreover equal, and in particular to the error correction methods and to the redundancies introduced. It can be seen therefore that the encoding efficiency, in terms of bit rate, is related to the encoding used. In other words, the more reliable the encoding, the lower is its bit rate.

From the viewpoint of channel encoding alone, it is therefore clear that a channel encoding system that uniformly protects the flow of data and is based on the sensitivity to transmission errors of the most significant bits is sub-optimal in terms of spectral efficiency (the number of bits/s/Hz).

The result thereof is high quality encoding for all the bits, and therefore an over-coding of the bits with low significance, leading to a loss in the transmission bit rate.

There already exist known methods to match the channel encoding with the requirements of the source encoding. It has notably been proposed to use rate compatible punctured convolutional (RCPC) codes which are associated, at reception, with a single Viterbi decoder working in soft decision mode. This method, described by R. V. Cox, N. Seshadri and C-E. W. Sundberg in "Combined Subband Source Coding And Convolutional Channel Coding", ITG Tagung: Digital Sprachverarbeitung, 26, Oct. 28, 1988, Bad Nauheim, achieves the periodic suppression, or puncturing, of certain bits of the source code when the maximum error rate permits it. However, this type of encoding remains related to a particular modulation, thus limiting the spectral efficiency that can be obtained. Thus, in the case of an RCPC encoding used with the 4-PSK modulation, it is possible at most to achieve a spectral efficiency that is strictly below 2. Besides, it does not seem to be possible to use this technique efficiently with modulations where there are more than four phase states.

The invention is aimed at overcoming these drawbacks.

SUMMARY OF THE INVENTION

More specifically, the invention is aimed at providing a COFDM type digital transmission device optimizing the efficiency of the transmission.

Another aim of the invention is to provide a device such as this that enables the optimization of the use of the transmission channel through the assigning of differentiated transmission techniques to portions of data of one and the same digital train as a function of the different protection levels sought, against transmission errors.

An additional aim of the invention is to provide a device such as this making use of the flexibility and independence between the carriers of the COFDM method.

These aims, as well others that shall appear hereinafter, are achieved by means of a device for the transmission of digital data with at least two levels of protection, of the type providing for the distribution of the data to be transmitted in the form of digital elements in the time-frequency space and the transmission of symbols each formed by a multiplex of N orthogonal carriers modulated by a set of said digital elements, and transmitted simultaneously, wherein said device includes channel encoding means comprising at least two types of modulation and/or at least two encoding efficiency levels.

Thus, it is possible to assign, to each type of data to be transmitted, as a function of the required level of protection against errors, an adequate modulation and/or encoding efficiency.

Advantageously, said multiplex of N carriers is divided into at least two sets of carriers, with a different type of modulation and/or an encoding with different encoding efficiency being assigned to each of said sets.

In this case, said sets of carriers are preferably interleaved along the frequency axis, in such a way that said sets of carriers benefit from the frequency independence related to the total bandwidth. Indeed, it is worthwhile to distribute the carriers over the greatest possible bandwidth, so as to provide for maximum robustness with respect to selective disturbances in frequency (notably fading phenomena).

In another embodiment, the transmission device of the invention includes, for at least one of said carriers, means for selection between at least two types of modulation and/or between at least two encoding efficiency levels as a function of the transmission bit rate and of the disturbances affecting the channel.

This provides for the optimal matching of the bit rate with the data to be transmitted.

Advantageously, in this second embodiment, the transmission device includes means for the generation of assistance data making it possible to have knowledge, in the receivers and for each digital data train received, of the corresponding selected types of modulation and-/or encoding efficiency levels.

These two embodiments may also be implemented simultaneously, it being possible for each set of carriers to use at least two types of modulation and/or two encoding efficiency levels, as a function of the data to be transmitted.

Preferably, said types of modulation are phase and/or amplitude modulation.

In another advantageous embodiment, the device of the invention includes, for at least one of said carriers, means for the optimal association of the encoded digital elements with the states of the constellation of the modulation, according to the so-called technique of trellis or lattice-encoded modulations.

To enable a coherent demodulation, the device advantageously includes means for the insertion of a frequency synchronization pattern recurrent in time, making it possible to carry out a coherent demodulation in said receivers.

Preferably, the transmission device of the invention includes at least two channel encoders using identical generating polynomials so as to enable the use, in the receivers, of a same decoder for several data trains encoded by distinct encoders.

BRIEF DESCRIPTION OF THE DRAWINGS

Other features and advantages of the invention will appear from the following description of an embodiment, given by way of a non-restrictive illustration, and from the appended drawings, of which:

FIG. 5 shows a detailed block diagram of a transmission device according to FIG. 2, in the case of an application to two protection levels;

DETAILED DESCRIPTION OF THE INVENTION

The device of the invention enables the optimum resolution of the problem of transmission of different data sources requiring different protection levels. It is based on the use of the COFDM method. Indeed, each of the carriers of the OFDM multiplex is modulated independently, thus making it possible to apply different modulations to them.

Thus, for example, it is possible to envisage the use, for the transmission of essential data, of a 4-PSK modulation, and for less significant data, of an 8-PSK or 16-PSK modulation. This latter modulation will be less robust than the former one, but each carrier will carry 1.5 times (8-PSK) or twice (16-PSK) as much information, for equal encoding techniques, thus leading to an increase in the final bit rate, without modifying the error rate associated with the essential data.

The overall bit rate D of binary information coming out of a source encoder to be transmitted on a multiplex of N carriers in a given band channel B, where B=N/ts, ts being the duration of an elementary symbol, can be written as:

$$D = \sum_{i=1}^{n} D_i,$$

where n is the number of sources.

If the different sources call for different protection levels with respect to the transmission errors, the bit rate values $D_i$ may be matched with each of the sources.

It is notably possible, with the COFDM method, to adapt to this type of differentiated sources by acting on the efficiency $R_i$ of the code associated with the bit rate $D_i$ source, for example by using puncturing techniques.

Figure 1:
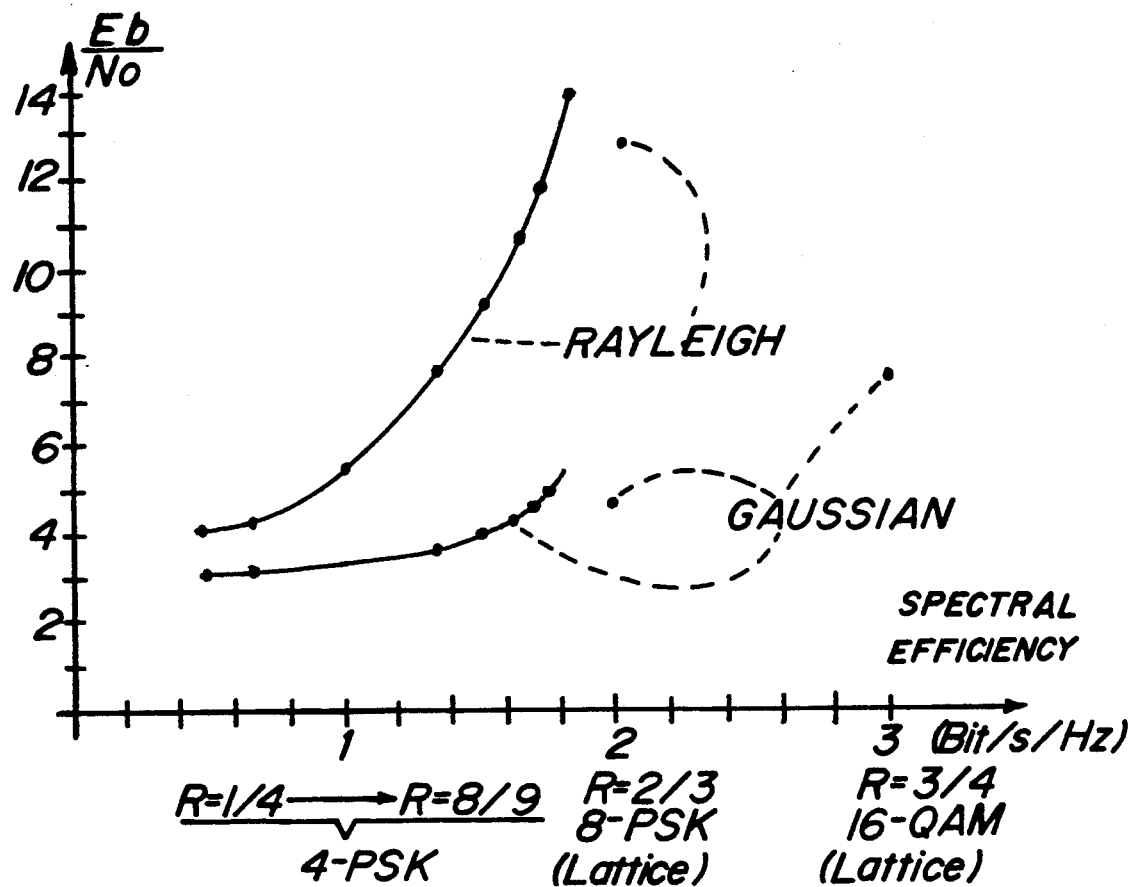
FIG. 1 shows curves of the ratio of the energy per useful bit to the spectral density of noise as a function of the spectral efficiency of different channel encoding modes, in the case of the Gaussian and Rayleigh channels.

FIG. 1 shows two curves of the ratio of energy per useful bit to the spectral noise density ($E_b/N_0$), for a binary error rate of $10^{-4}$, as a function of the spectral efficiency (in bits/s/Hz) of the modulation, for several types of modulation (4-PSK, 8-PSK, 16-QAM), in Gaussian and Rayleigh channels. For a 4-PSK encoding, it is possible to make the efficiency vary by ¼ to 8/9, the spectral efficiency then varying by 0.5 bit/s/Hz to nearly 2 bits/s/Hz. At the same time, the error rate increases substantially, notably in the case of disturbed channels, of the selective Rayleigh channels type. Furthermore, the spectral efficiency remains below 2 bits/s/Hz.

It is therefore more worthwhile, from the viewpoint of power efficiency, to pass on to constellations of modulation with a greater number of states associated with adequate methods of encoding according to the principle of Ungerboeck lattice-encoded modulations (LEM). It is noted, for example, that it is better to use an 1-PSK modulation with an efficiency R=⅔ (with an LEM encoding) than a 4-PSK modulation with an efficiency R=8/9 (LEM encoding).

The system of the invention also enables acting on the type of modulation of each carrier. This carrier will be characterized by the number of bits $nb_i$ borne per modulation state. A carrier i will therefore have $2^{nbi}$ states.

To the bit rate $D_i$, there therefore corresponds, at the output of the encoder, a bit rate $D_i/R_i$ to be distributed over $N_i$ carriers modulated with $2^{nbi}$ states, with the following relationships:

$$N = \sum_{i=1}^{n} N_i,$$

$$N_i = (D_i \cdot ts)/R_i \cdot nb_i$$

To obtain optimal results, it will be sought to adapt $D_i$ and ts so that $N_i$ is an integer.

If we apply the principle of lattice-encoded modulation described by Ungerboeck in "Channel Coding With Multilevel Phase Signal", IEEE Transactions, Information Theory, Vol. I.T. 28th Jan. 1982, i.e. the optimum association of $n_i+1$ bit encoded words coming out of an encoder having an efficiency value of $R_i = n_i/(n_i+1)$ with the states of the constellation of $2^{ni+1}$ state modulation so as to maximize the distance between signals, we also having the following relationship:

$$nb_i = n_i + 1$$

or again $R_i \cdot nb_i = n_i$.

The optimum association between encoded words and states of modulation by lattice encoding enables a major encoding gain, for equal spectral efficiency, as compared with a modulation system having a $2^n$ state system without encoding.

Figure 2:
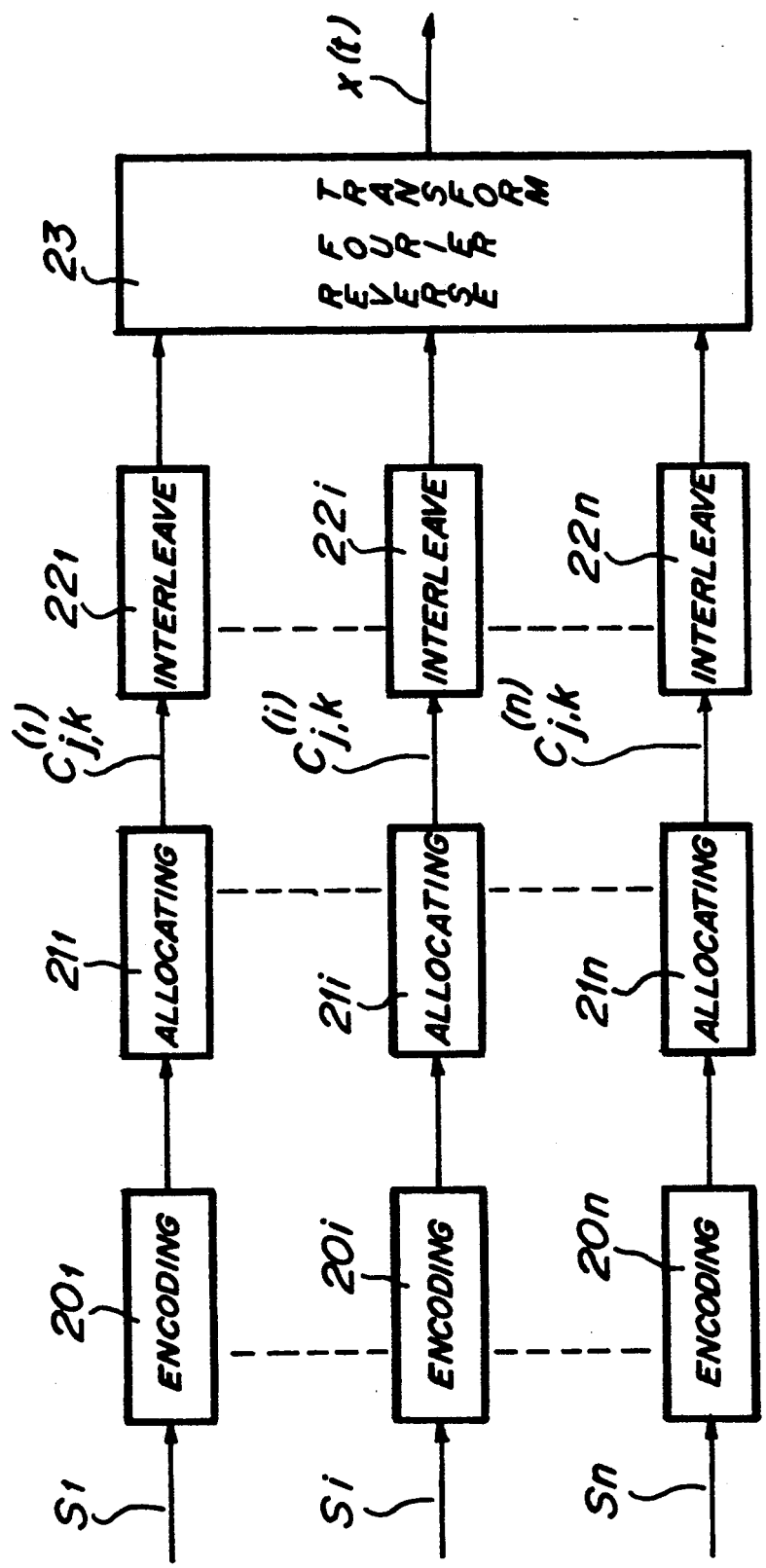
FIG. 2 is a block diagram of a transmission device according to the invention.

FIG. 2 shows a block diagram of a transmission device with n data sources S1 and Sn according to the invention, with n types of modulation and, hence n different encoding efficiency values $R_i$.

After the operation $20_i$ (with i varying from 1 to n) for the encoding of each series of data having a bit rate $D_i$ with an efficiency $R_i$ and allocation $21_i$ optimized of a modulation state according to Ungerboeck's method, we therefore obtain complex symbols $C^{(i)}_{j,k}$, belonging to an alphabet having $2^{ni+1}$ states. The symbols $C^{(i)}_{j,k}$ are then interleaved ($22_i$) in time and in frequency and then, according to the known COFDM method, they undergo a reverse Fourier transform 23 to give the signal to be transmitted.

$$x(t) = \sum_{j=-\infty}^{+\infty} \sum_{i=1}^{n} \sum_{k \in I_i} C^{(i)}_{j,k} \phi_{j,k}(t)$$

with:
card $(I_i) = N_i$
$\psi_{j,k}(t) = gk(t - jts)$ for $0 \leq t \leq s$
$gk(t) = e^{2i\pi f_k t}$ for $0 \leq t \leq ts$ 0 again $$f_k = f_0 + k/ts$$

i: index of the alphabet of modulation
k: temporal index of the symbols
k: index of the carriers At reception, the complex carriers received after demodulation and discrete Fourier transform have the form:

$$Y_{j,k}^{(i)} = H_{j,k} \cdot C^{(i)}_{j,k} + N_{j,k}$$

where $N_{j,k}^{(i)}$ represents a complex Gaussian noise and $H_{j,k}$ the response of the channel.

Each decoding process, associated with the index i, then minimizes the following expression according the criterion of maximum a posteriori likelihood:

$$\Sigma\Sigma \| Y_{j,k}^{(i)} - H_{j,k} \cdot C^{(i)}_{j,k} \| / 2\sigma^2_{j,k}$$

where $\sigma^2_{j,k}$ is the variance of each component of complex Gaussian noise $N_{j,k}$.

The invention is not restricted to the use of several types of modulation. It is notably possible to use also the puncturing technique or any other technique to adapt the efficiency of the encoding with one or more types of modulation.

Figure 3:
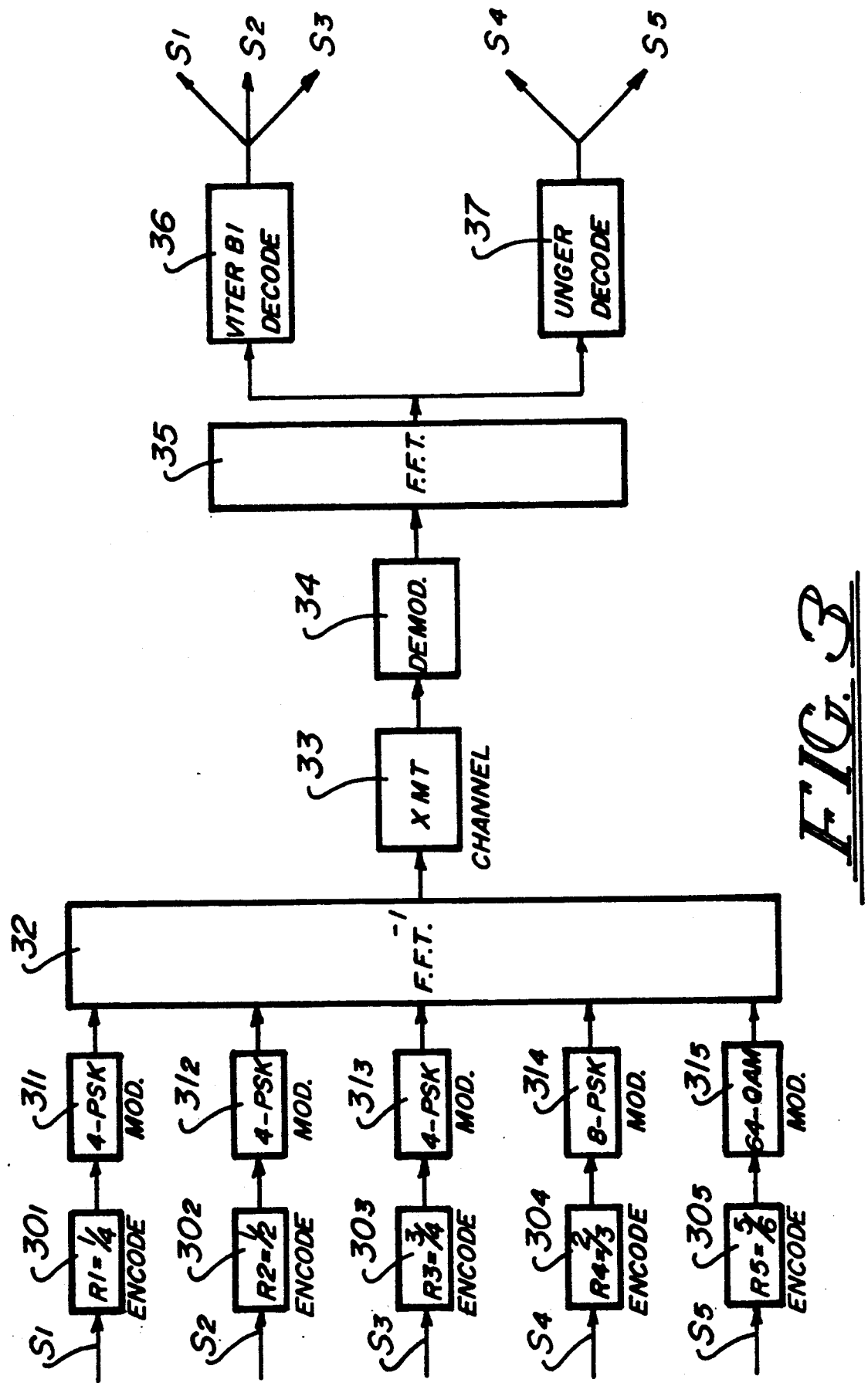
FIG. 3 is a block diagram of a overall transmission and reception chain according to the inventions, showing the encoding and decoding parts.

FIG. 3 shows the general block diagram of a transmission and reception chain according to the invention, implementing several modulations, and the RCPC puncturing technique.

This system achieves the differential encoding of five sources of data S1 to S5 calling for levels of protection against distinct and decreasing transmission errors.

the first three data sources S1, S2 and S3 are encoded according to a 4-PSK modulation $31_1$, $31_2$ and $31_3$ with punctured codes having respective efficiency values R1=¼, R2=½ and R3=¾ in the encoders $30_1$, $30_2$ and $30_3$.

The data source S4 is processed by a lattice encoder $30_4$ with an efficiency R=⅔ and an 8-PSK modulation $31_4$, and the data source S5 is processed by a lattice encoder $30_5$ with an efficiency R5=5/6 and a 64-QAM $31_5$ modulation (64-state quadrature amplitude modulation), both being processed according to a lattice modulation technique.

Advantageously, the generating polynomials of the encoders $30_4$ and $30_5$ are identical so that the encoded data can be decoded at reception by only one decoder 37 if this decoder is made in a way that can be sufficiently parametrized.

According to the known COFDM encoding techniques, the different pieces of encoded data are subjected to a reverse fast Fourier transform ($FFT^{-1}$) 32, and then transmitted by the transmitted channel 33.

At reception, the demodulation 34 may be either differential (for the PSK modulations) as in the radio broadcasting system described in the above-mentioned U.S. Pat. No. 4,881,241 or done coherently, as presented in the French patent application No. 90.01492 dated Feb. 6th 1990 and filed on behalf of the same Applicant. It is clear, by contrast, that a QAM modulation can be demodulated only coherently.

In the latter case, one method consists in the introduction, into the transmitted multiplex, of a frequency synchronization pattern that is recurrent in time, enabling the decoders to recover a phase and/or amplitude reference.

The reception part then includes a fast Fourier transform (FFT) 35 in which the reverse of the $FFT^{-1}$ operation 32 is performed, and then the decoding itself.

The choice of identical encoding generator polynomials enables the number of decoders in the receiver to be limited.

Thus, in the example given, the three sources S1, S2 and S3 could be decoded by the Viterbi decoder 36. The two sources S4 and S5, processed by the two lattice encoders $30_4$ and $30_5$ having the same polynomials, could also be decoded by the same Ungerboeck decoder 37.

The COFDM system fully uses the two dimensions, namely the temporal and frequency dimensions, by its wideband character and by means of the time-frequency interleaving which, in being associated with the method of de-interleaving at reception, makes it possible to obtain, at the input of the decoder, the maximum statistical independence of the successive samples with respect to disturbances due to transmission.

The method of the invention makes it possible to lose nothing in terms of frequency independence if we use an optimum frequency multiplexing of the different combs of the carriers associated with the different sources Di.

Figure 4:
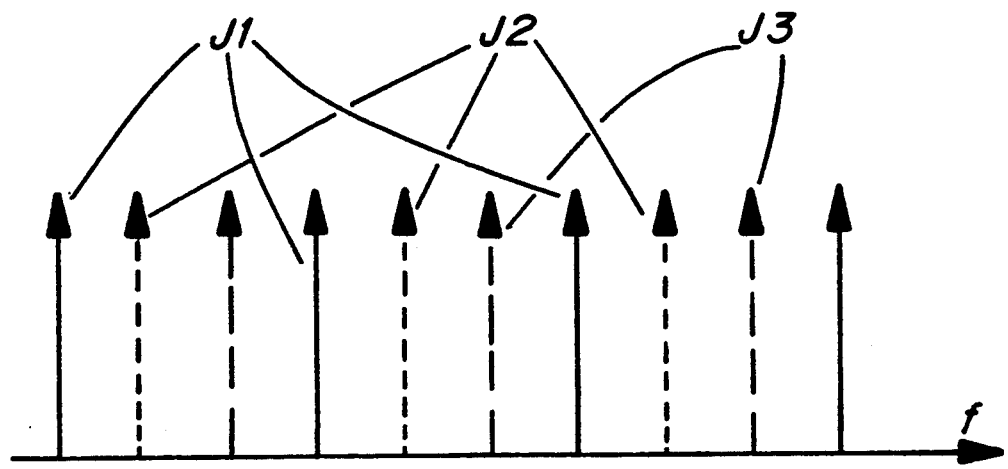
FIG. 4 is an example of interleaving of the sets of carriers, in the case of three difference sources, from the viewpoint of the level of protection against the transmission errors.

For this purpose, the different sets of carriers are interleaved along the frequency axis. For example, in the case of three different sources, the multiplexing could be of the kind shown in FIG. 4 for the three sets of carriers J1, J2, J3. In this case, each of the three sets of carriers benefits from the independence in frequency, related to the total bandwidth.

Thus, the method of the invention remains optimal for each source Di in terms of power and spectral efficiency.

The method described by Ungerboeck, defining the right codes and relying on the optimum association of the encoded words with the states of the constellation according to the criteria of maximization of distance between signals makes it possible to organize the performance characteristics independently for each of the sources Di.

An example of an application with numerical values is given here below. It can be applied notably to the broadcasting of sequences of images distributed among two complementary trains of data elements b1 and b2, as described in the joint patent application filed on the same date on behalf of the present Applicant.

In this case, the modulation and encoding parameters are fixed. The devices described can nevertheless be adapted to a different choice of these parameters.

A transmission channel identical to the one used in the sound broadcasting system already made it used. The available width of the transmission channel is B=N/ts=7 MHz. The width of the symbols Ts=80 μs (including the duration of the useful signal ts=64 μs and a guard interval Δ=16 μs). The number of carriers of the multiplex N is then equal to 448.

It is therefore proposed to use two different levels of protection with respect to transmission errors.

the first level, associated with the first data train b1, corresponds to the method used during the first implementation of the COFDM encoding in the known radio broadcasting system. The following are its parameters:
4-PSK modulation, demodulated coherently, giving a spectral efficiency
$nb_1=2$ binary elements per Hertz (eb/Hz)
code efficiency $R_1=\frac{1}{2}$
number of carriers of the associated OFDM multiplex equal to N1.

The useful bit rate transmitted D1 is therefore equal to:

$$D1 = nb_1 \times R_1 \times (N1/ts) \times (ts/Ts) \times (ts/Ts) = 2 \times (\tfrac{1}{2}) \times (N1/ts) \times (4/5)$$

If we lay down N1=224, namely half of the available carriers, we obtain a useful bit rate D1=2.8 Mbit/s.

The second protection level, associated with the second data train, makes use of lattice-encoded modulation techniques (Ungerboeck techniques) in achieving a closer association of a lattice code with a modulation with a large number of states. The following are its parameters:
8-PSK modulation coherently demodulated, giving a spectral efficiency of $nb_2=2$ eb/Hz,
efficiency of the code $R_2=\frac{2}{3}$,
the number of carriers is N2.

The transmitted useful bit rate D2 benefiting from this second level of protection is equal to:

$$D2 = nb_2 \times R_2 \times (N2/ts) \times (ts/Ts) = 3 \times (\tfrac{2}{3}) \times (N2/ts) \times 4.5$$

If we fix N2=224, we get:

$$D2 = 5.6 \text{ Mbits/s}.$$

The two data trains preferably include data of different degrees of importance, notably according to a psychovisual criterion. The method of the invention enables the transmission of the most pertinent data, corresponding to the train b1, by means of a sufficiently robust encoding. The less significant data of the train B2 is transmitted with less efficient protection against the transmission errors (this is not troublesome) and with a double useful bit rate D2.

FIG. 5 shows a block diagram of transmission equipment corresponding to the above-described example.

the pieces of data 50 coming from the source are separated into two binary trains b1 and b2, with respective bit rates D1, D2, by a distribution module 51.

The first binary train b1 is processed in a way similar to that applied during the first setting up of the COFDM system. A convolutive encoding 52 is therefore done, with efficiency $R_1=\frac{1}{2}$, then a time-frequency interleaving 53 is carried out followed by a signal binary encoding 54. Complex data $C_{j,k}$ are then obtained. These pieces of data are processed for transmission in the COFDM modulation module 56.

The second binary train b2 undergoes an Ungerboeck type convolutive encoding 57, or lattice encoding, with $2^{k-1}$ states (k being the constraint length) and with efficiency $R_2=\frac{2}{3}$, then an operation 58 is done for the association, with each triplet of bits coming from the lattice encoder 57, of a signal $a_n$ of the constellation of PSK modulation according to the method described by Ungerboeck under the term "set partitioning" in the already mentioned document.

The signal $a_n$ may be written:

$$a_n = e^{jk\mu/8 + \pi/16}, k \in \{0, \ldots, 7\}$$

This signal $a_n$ is then time and frequency interleaved (59) and then directed towards the COFDM modulation module 56.

In a known way, this module 56 notably achieves a reverse fast Fourier transform on complex 512 word blocks and a digital-analog conversion.

The resultant complex sample then modulates a carrier in phase and in quadrature to produce the signal 60 to be transmitted.

Figure 6:
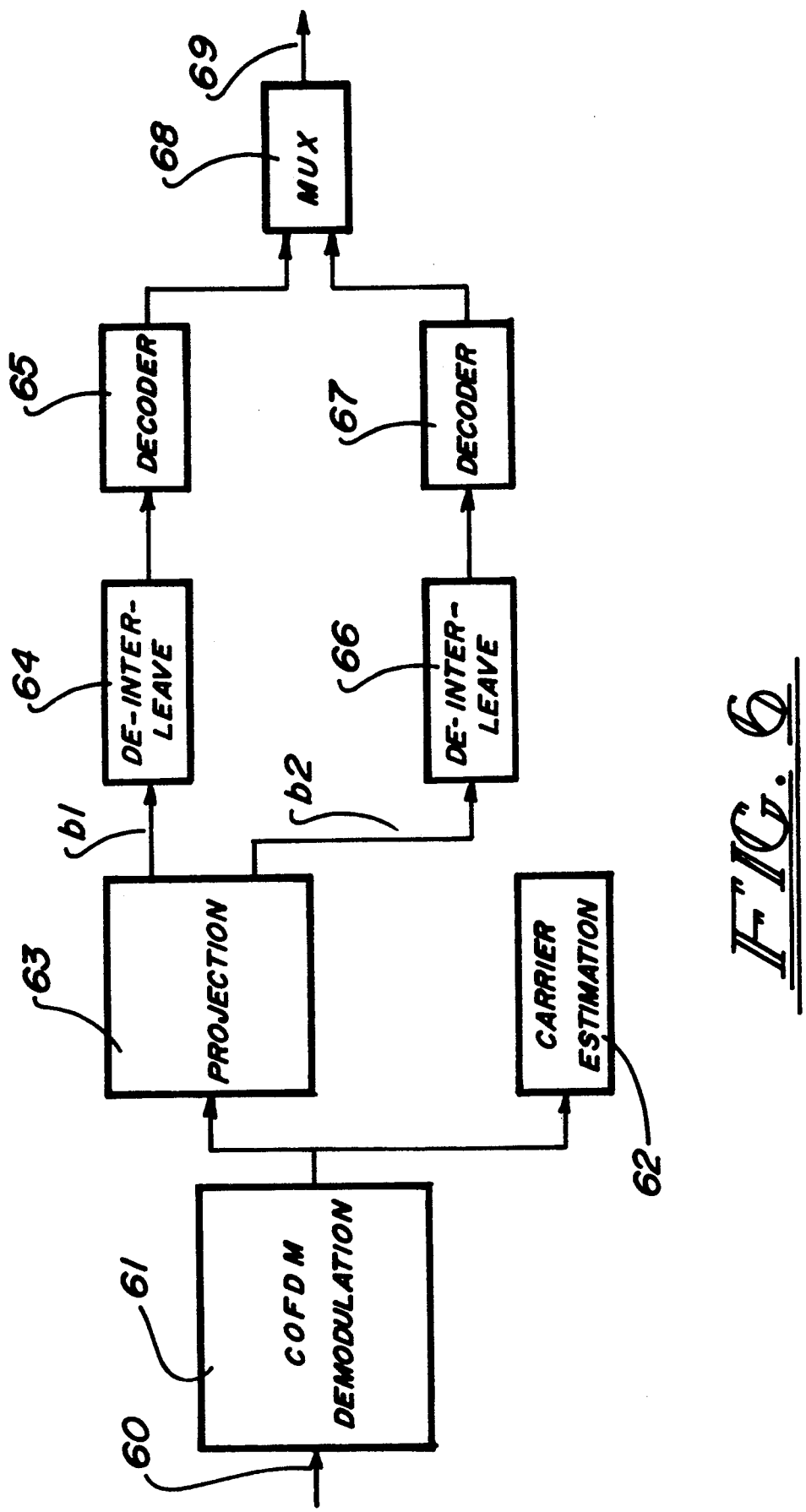
FIG. 6 shows the detailed block diagram of a reception device corresponding to the transmission device of FIG. 5.

FIG. 6 shows a block diagram of the complete reception equipment corresponding to the above-described transmitter. The received signal 60 is processed by the COFDM demodulation module 61 which notably carries out a channel filtering, a demodulation on two channels in quadrature with reference to its central frequency, a digitization and a processing operation by a processor of the signal which carries out a fast Fourier transform (FFT).

A function 62 for the estimation of the carriers of the OFDM multiplex is used to make the projection 63 on the two axes of the complex plane, using frequency synchronization words, so as to carry out a coherent demodulation.

The two information trains b1 and b2 are then decoded separately. The train b1 undergoes a time-frequency de-interleaving 64 and is then decoded by a Viterbi decoder 65. The second train b2 is also de-interleaved (66) in time and frequency, and decoded by an Ungerboeck decoder 67. The data coming from the two decoders 65 and 67 are then assembled by a multiplexer 68 so as to give the complete data signal 69.

In the example described, concerning the broadcasting of digital images, it is possible to make a second type of receiver, which is simpler and includes only the processing operation related to the information train b1. If the distribution between the two trains b1 and b2 is done judiciously, it is indeed possible to reconstruct images by means of the train b1 alone. These images will clearly be of lower quality, but they will however be acceptable, notably for small-sized screens.

These receivers using only the train b1, which is more robustly encoded, may especially be used under difficult conditions of reception, for example reception in mobile receivers in an urban environment.

It is clear that the above-described invention in no way restricts the scope of the invention. There may be any number of sources of information or data trains to be processed with distinct protection levels. The protection level may be adapted by acting either on the code efficiency used or on the type of modulation. Moreover, the invention is applicable not only to the broadcasting of digital images but also to sound broadcasting and, more generally, to the broadcasting of any type of digital information. It enables the differentiated processing, not only of sub-sets of one and the same program but also of completely independent programs.

Figure 7:
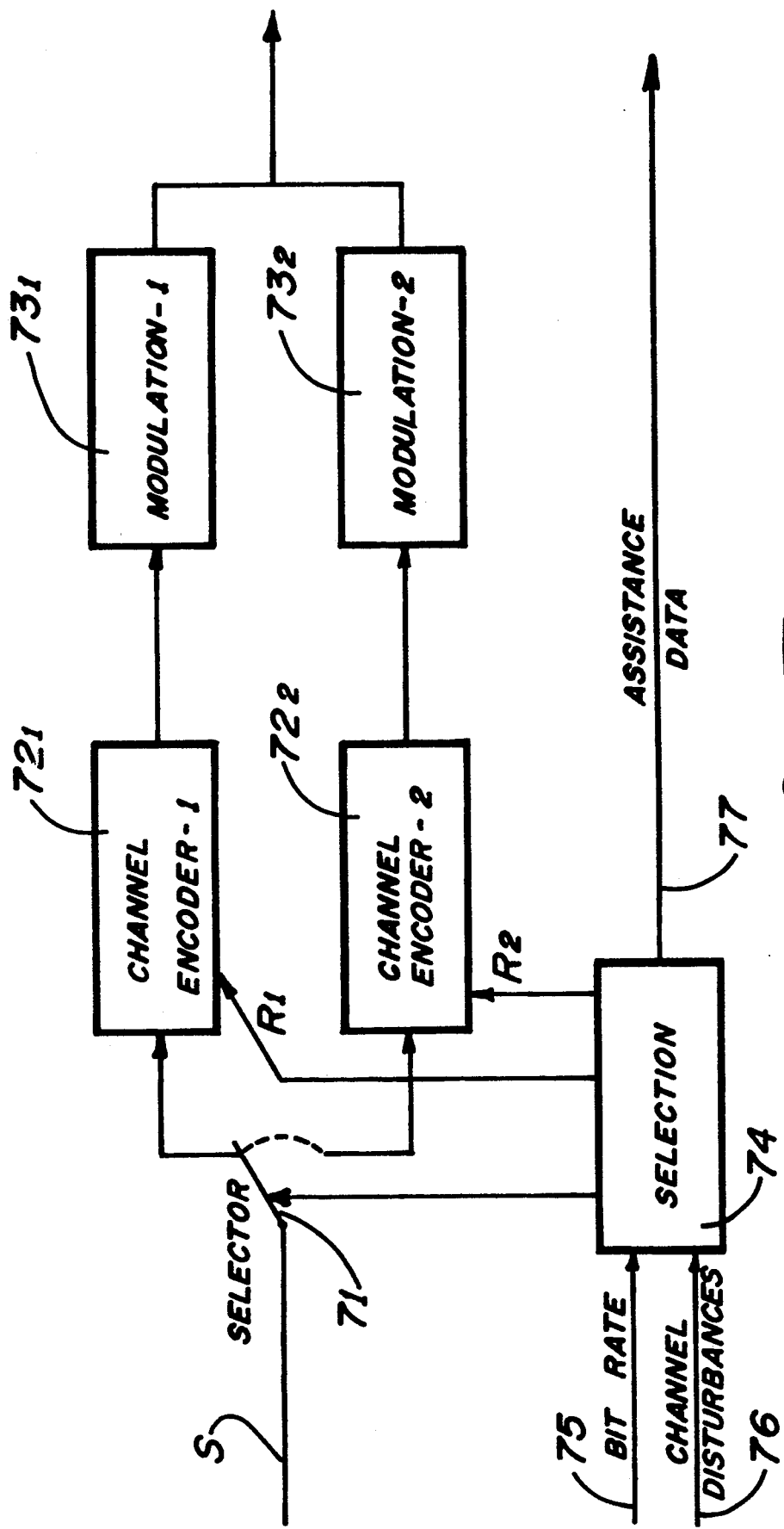
FIG. 7 shows a detailed block diagram of a selection means for selecting one of several possible modulation means.

In another embodiment as illustrated in FIG. 7, the modulation and/or the encoding efficiency assigned to each carrier or set of carriers may be variable, for example as a function of the importance of the information to be transmitted at each instant. A selector means 71 delivers the signals to be channel encoded to one or the other of two channel encoders $72_1$, $72_2$ and two modulation means $73_1$ and $73_2$. This selector means 71 is controlled by a selection module 74, taking into account a bit rate piece of information 75 and a channel disturbance piece of information 76. This selection module moreover selects the efficiency levels R1 and R2 of the channel encoders $72_1$, $72_2$. So as to enable the receivers to know the modulation and/or the efficiency selected, pieces of assistance data 77 are generated at transmission. These pieces of assistance data 77 should enable the receiver to work, especially in the case of sound or audiovisual reception, as soon as it is put into operation. This may be achieved, for example, by the assignment of certain carriers to the transmission of assistance data.

What is claimed is:

1. A device for transmission of digital data in the form of a series of data elements, said device comprising:
   distributing means for distributing said data elements into at least two sets of data elements, a first of the sets of data elements requiring a first level of protection and at least one second set of data elements requiring a second level of protection;
   at least two distinct modulation means, each modulation means being coupled to the distributing means to receive only one of the sets of data elements, each modulation means using a distinct type of modulation employing a different modulation alphabet made of modulation symbols to supply a series of modulation symbols corresponding to the set of data elements being selectively fed to each modulation means;
   at least two distinct interleaving means coupled to the modulation means, each interleaving means being supplied a plurality of orthogonal frequency carriers, each of the frequency carriers being allocated with a distinct succession of modulation symbols picked out of one of said series of modulation symbols, for interleaving in both time and frequency all of said modulation symbols in each of said series to form interleaved signals wherein no two successive modulation symbols of any series of modulation symbols is associated with the same frequency carrier; and
   processing means coupled to all of the interleaving means for processing the interleaved signals to form an output signal suitable for transmission incorporating said sets of data elements in a form including differing levels of protection.

2. A device for transmitting digital data in the form of a series of data elements, the device employing a plurality of orthogonal frequency carriers, said device comprising:
   distributing means for distributing said digital data into at least two sets of data elements, a first of the sets of data elements requiring a first level of protection and at least one second set of data elements requiring a second level of protection;
   first modulation means, coupled to the distributing means to receive the first set of data elements, for associating the first set of data elements with a first series of modulation symbols selected according to a first modulation symbol alphabet corresponding to a first type of modulation providing for said first level of protection;
   first interleaving means, coupled to the first modulation means to supply each frequency carrier of a first selected set of said plurality of orthogonal frequency carriers with a distinct succession of modulation symbols picked out of said first series of modulation symbols, for interleaving in both time and frequency all of the first series of modulation symbols so that no two successive modulation symbols is supplied to the same frequency carrier;

at least one second modulation means, coupled to the distributing means to receive a different set of data elements from said at least one second set of data elements, for separately associating with each different set of data elements a separate series of modulation symbols selected from distinct modulation symbol alphabets corresponding to at least a second type of modulation providing for said second level of protection;

a separate second interleaving means, coupled to each second modulation means to supply each frequency carrier of a separate set of said orthogonal frequency carriers with a distinct succession of modulation symbols picked up out of one of said separate series of modulation symbols, for interleaving in both time and frequency all of the modulation symbols of each series is supplied to the same frequency carrier;

processing means coupled to all of the interleaving means for procession the interleaved signals to form an output signal suitable for transmission incorporating said sets of data elements in a form including differing levels of protection; and transmitting means coupled to the processing means for transmitting said output signal.

3. A device according to claim 1 or 2 further comprising selecting means for selecting one of said distinct types of modulation associated with each of said modulation means, said selecting means taking into account at least one piece of information belonging to the following group: transmission bit rate and level of transmission disturbances.

4. A device according to claim 1 or 2 further comprising means for generating assistance data, said assistance data representing the type of modulation used in the modulation means associated with each carrier.

5. A device according to claim 1 or 2 wherein said types of modulation used by each of said modulation means are selected from the following group: phase modulation, amplitude modulation, phase and amplitude modulation, and lattice encoded modulation.

6. A device according to claim 1 or 2 wherein each of said modulation means, for at least one of said carriers, comprises means for optimally associating said sets of digital data elements with the states of a constellation of modulation, according to the lattice encoded modulation technique.

7. A device according to claim 1 or 2 further comprising a distinct channel encoder coupled to each of said modulation means, at least two of the distinct channel encoders having different encoding efficiency levels.

8. A device according to claim 7 wherein said distinct channel encoders include means for variable efficiency puncturing of a source code to obtain said levels of encoding efficiency.

9. A device according to claim 7 wherein at least two of said distinct channel encoders uses identical generating polynomials.

10. A device according to claim 7 wherein said plurality of orthogonal frequency carriers is divided into at least two sets of frequency carriers corresponding to the number of distributed sets of data elements, said interleaving means selectively supplying the modulation symbols encoded by each of said distinct channel encoders to a unique one of said sets of frequency carriers.

11. A device according to claim 7 further comprising means for selection between at least two distinct channel encoders, said means for selection taking in account at least one piece of information belonging to the following group: transmission bit rate and level of transmission disturbances.

12. A device according to claim 1 or 2, wherein each of said modulation means comprises means for allocating a succession of modulation states, in the form of modulation symbols belonging to said modulation alphabet corresponding to the type of modulation of said modulation means, to the set of data elements fed in said modulation means.

13. A device according to claim 1 or 2, wherein said processing means include means for applying a reverse fast Fourier transform to successive sequences of modulation symbols supplied by said first and at least second interleaving means.

14. A device for reception of digital data transmitted by a device according to claim 9, said device for reception having as many channel decoders as said transmission device has channel encoders with different generating polynomials.

* * * * *

UNITED STATES PATENT AND TRADEMARK OFFICE
CERTIFICATE OF CORRECTION

PATENT NO. : 5,197,061
DATED : March 23, 1993
INVENTOR(S) : Roselyn Halbert-Lassalle, et. al.

It is certified that error appears in the above-identified patent and that said Letters Patent is hereby corrected as shown below:

column 11, line 20, after the word "series", please insert --so that no two successive modulation symbols of any series--; and column 11, line 23, please delete "procession" and insert therefor --processing--.

Signed and Sealed this

Twenty-third Day of November, 1993

*Attest:*

BRUCE LEHMAN

*Attesting Officer*  *Commissioner of Patents and Trademarks*